(12) United States Patent
Jeon

(10) Patent No.: US 6,278,749 B1
(45) Date of Patent: Aug. 21, 2001

(54) DATA DETECTOR AND METHOD FOR DETECTING DATA

(75) Inventor: Jin-kyu Jeon, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/090,165

(22) Filed: Jun. 4, 1998

(30) Foreign Application Priority Data

Aug. 21, 1997 (KR) .................................. 97-39946

(51) Int. Cl.[7] .............................. H03D 1/00; H04L 27/06
(52) U.S. Cl. ............................ 375/341; 375/371; 331/17
(58) Field of Search ......................... 375/371, 354, 375/355, 341, 340, 262, 375, 376; 714/794, 795; 329/318, 319; 331/17, 18, 25; 360/46, 51, 65; 369/59, 48

(56) References Cited

U.S. PATENT DOCUMENTS

| | | | |
|---|---|---|---|
| 5,442,492 | * 8/1995 | Cunningham et al. | 360/46 |
| 5,455,813 | * 10/1995 | Hayashi | 369/59 |
| 5,553,104 | 9/1996 | Takashi et al. | 375/373 |
| 5,606,540 | * 2/1997 | Hayashi | 369/59 |
| 5,625,632 | 4/1997 | Ishida et al. | 371/43 |
| 5,663,945 | * 9/1997 | Hayashi et al. | 369/48 |
| 5,742,576 | * 4/1998 | Hayashi et al. | 369/59 |
| 5,745,315 | * 4/1998 | Aoyama | 360/65 |
| 5,748,045 | * 5/1998 | Tateishi | 331/17 |
| 5,790,613 | * 8/1998 | Tateishi | 375/376 |
| 5,805,024 | * 9/1998 | Takashi et al. | 331/17 |
| 5,867,333 | * 2/1999 | Saiki et al. | 360/51 |
| 5,870,591 | * 2/1999 | Sawada | 713/500 |
| 5,917,863 | * 6/1999 | Soichi et al. | 375/341 |
| 5,937,020 | * 8/1999 | Hase et al. | 375/376 |
| 5,940,449 | 8/1999 | Kaaden et al. | 375/341 |
| 5,963,518 | * 10/1999 | Kobayashi et al. | 369/48 |
| 5,995,465 | * 11/1999 | Hayashi et al. | 369/59 |
| 6,075,394 | * 6/2000 | Shoji | 327/156 |
| 6,134,279 | * 10/2000 | Soichi et al. | 375/341 |

FOREIGN PATENT DOCUMENTS

| | | | |
|---|---|---|---|
| 0 530 776 | 3/1993 | (EP) | G11B/20/14 |
| 4-89664 | 3/1992 | (JP) | G11B/20/10 |
| 5-135510 | 6/1993 | (JP) | G11B/20/14 |
| 6-195892 | 7/1994 | (JP) | G11B/20/14 |
| 9-7304 | 1/1997 | (JP) | G11B/20/10 |

OTHER PUBLICATIONS

R.D. Cidecyan et al.: "A PRML: System for Digital Magnetic Recording " IEEE Journal on Selected Areas in Communications, vol. 10, No. 1, Jan. 1992, pp. 38–56, XP000457625.

* cited by examiner

*Primary Examiner*—Stephen Chin
*Assistant Examiner*—Lenny Jiang
(74) *Attorney, Agent, or Firm*—Sughrue, Mion, Zinn, Macpeak & Seas, PLLC

(57) ABSTRACT

A data detector and a data detection method. The data detector includes: a converter for converting a received signal into digital data according to a sampling clock signal; a maximum likelihood decoder for performing maximum likelihood decoding of the digital data; and a generator for measuring a phase difference between sampling points of the digital data and optimal detection points of the received signal, and for generating a control signal for changing the phase of the sampling clock signal according to the measured phase difference. The phase of the sampling points as the data detection points matches that of the optimal detection points, so that error caused by difference in phase is minimized, thereby enhancing the performance of the maximum likelihood decoder, and the overall performance in detection of reproduced data.

31 Claims, 7 Drawing Sheets

DATA DETECTOR AND METHOD FOR DETECTING DATA

BACKGROUND OF THE INVENTION

1. Field of the Invention

The present invention relates to data detection, and more particularly, to a data detector for improving performance in maximum likelihood detection, and a method therefor.

2. Description of the Related Art

Signal processing technology relating to partial response maximum likelihood (PRML) decoding, including a Viterbi decoding process, has been applied to increase recording density without a drastic change in the characteristics of a conventional recording/reproducing apparatus. Many devices for implementing such technology have been suggested.

FIG. 1 is a block diagram showing the recording/reproducing unit of a digital videocassette recorder (VCR) having a partial response (PR) 4 (+1,0,−,1) type. In FIG. 1, input data to be recorded is modulated by a precoder 102. That is, the output of an adder 104 of the precoder 102 is delayed by a time corresponding to 2 bits of the input data, by two unit delays (D) 106 and 108, and then fed back to the adder 104. The adder 104 performs an exclusive OR operation on the input data and the feedback data. Such operation of the precoder 102 converts the input data into an interleaved non-return to zero inversion (NRZI) data. Here, D represents a unit delay corresponding to 1 bit of the input data.

A recording amplifier 110 is current driven and flows enough current through a recording head HD1 of a channel 112 such that data is recorded on a recording medium T in an optimal state. A signal reproduced by a reproducing head HD2 of the channel 112 is amplified to a desired amplitude by a playback amplifier 114. Then, an equalizer 116 compensates for distortion in the waveform and amplitude of the reproduced signal. The compensation involves removing a DC component and transmitting only a high frequency component which indicates transition of record data as a differential type pulse, due to a differential characteristic of the channel 112. Here, the reproduced signal output from the playback amplifier 114 after being amplified is a PR(+1,−1) type signal.

The differential type channel characteristic corresponds to a (1−D) characteristic. A channel demodulator 118 having a (1+D) integral characteristic converts the PR(+1,−1) type signal output from the equalizer 116 into a PR4(+1,0,−1) type signal, so that the signal modulated by the precoder 102 of a recorder is demodulated into the original record data. Here, the channel demodulator 118 includes a delay 120 for delaying the output of the equalizer 116 by a unit bit (1 bit), and an adder 122 for adding a signal delayed by the delay 120 to the output of the equalizer 116. A clock generator 124 detects timing of the reproduced signal equalized by the equalizer 116 using an internal phase locked loop (PLL) circuit to generate a clock signal required for a data detector 126.

The data detector 126 further includes an analog-to-digital converter (ADC) 128 and a digital Viterbi decoder 130. The ADC 128 converts the output of the channel demodulator 118 into digital data according to a sampling clock signal generated by a clock generator 124, and the digital Viterbi decoder 130 decodes the digital data using a Viterbi decoding algorithm, which is a maximum likelihood decoding algorithm, according to a driving clock signal generated by the clock generator 124. In the ideal case, a sampling point of the ADC 128 corresponds to a detection point for the reproduced data, the sampling point being a critical factor for determining the performance of the digital Viterbi decoder 130. However, the conventional data detector 126 shown in FIG. 1 cannot process a continuously varying signal, so a phase error occurs between the sampling point and the actual optimal detection point. As a result, Viterbi decoding performance is lowered.

SUMMARY OF THE INVENTION

To solve the above problems, an object of the present invention is to provide a data detector which adaptively matches the phase of a sampling point of an input signal, as a data detection point, to the phase of an optimal detection point of an actual reproduced signal while maximum likelihood decoding is performed on reproduced data, thereby providing optimal decoding performance while coping with various changes in the reproduced signal.

It is another object of the present invention to provide a data detection method in which the phase of sampling points of an input signal, as data detection points, are adaptively matched to the phase of optimal detection points of an actual reproduced signal, while a maximum likelihood decoding is performed on reproduced data, thereby providing the optimal performance while coping with various changes in the reproduced signal.

To achieve the first object, there is provided a data detector comprising a converter, a maximum likelihood decoder, a generator and a phase shifter. The converter converts a received signal into digital data according to a sampling clock signal, the maximum likelihood decoder performs maximum likelihood decoding of the digital data, and the generator measures a phase difference between sampling points of the digital data and optimal detection points for the received signal and generates a control signal for changing the phase of the sampling clock signal according to the measured phase difference. Also, the phase shifter shifts a phase of the sampling clock signal according to the control signal.

To achieve the second object, there is provided a method for detecting data comprising the steps of: (a) converting a received signal into digital data according to a sampling clock signal; (b) performing maximum likelihood decoding of the digital data; and (c) measuring a phase difference between sampling points of the digital data and optimal detection points for the received signal; and (d) generating a control signal for changing the phase of the sampling clock signal according to the measured phase difference. Also, the data detection method of the present invention may further comprise the step of (e) shifting the phase of the sampling clock signal according to the control signal.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Figure 1:
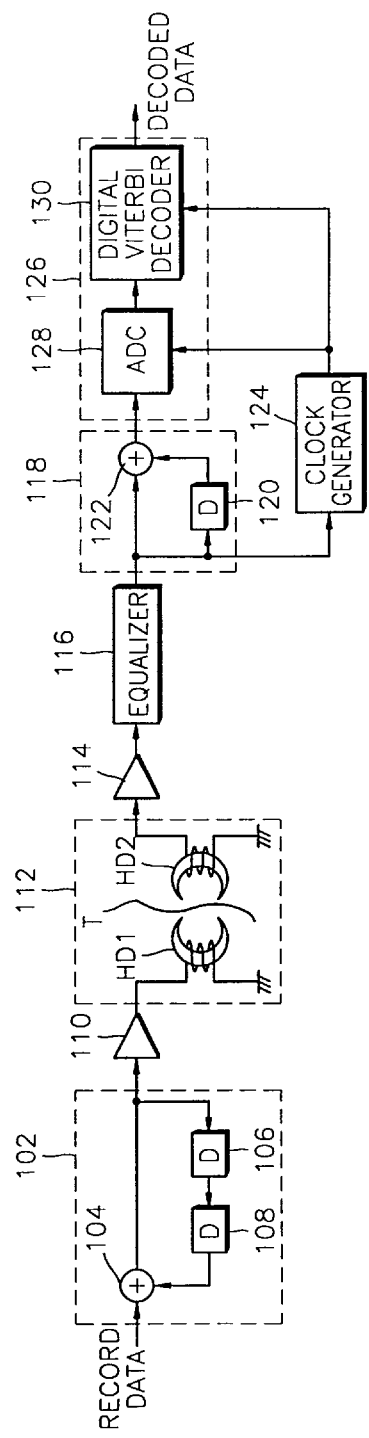
FIG. 1 is a block diagram showing the structure of the recording/reproducing unit of a digital videocassette recorder (VCR) having a conventional data detector.
Figure 2:
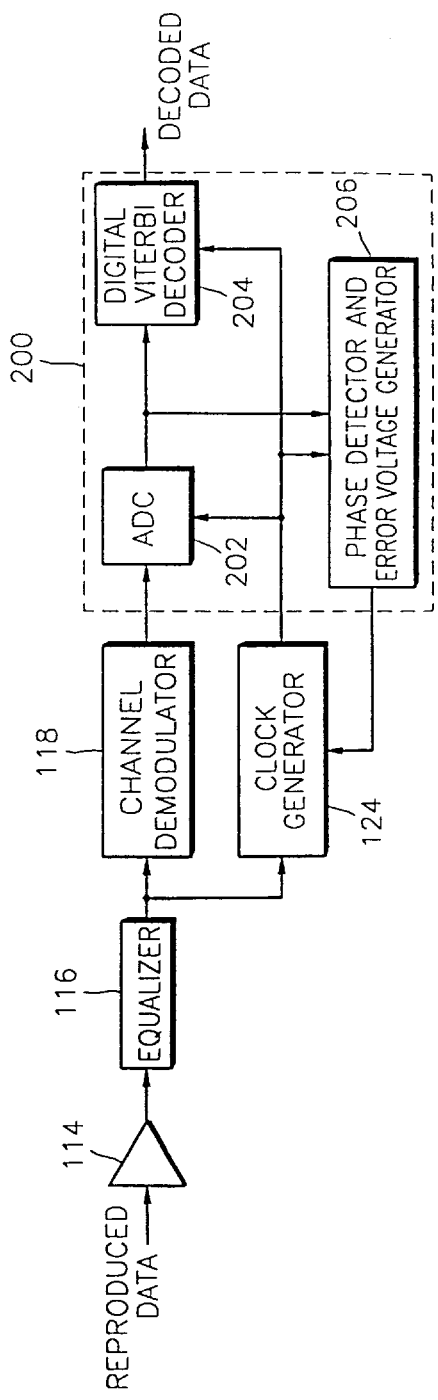
FIG. 2 is a block diagram of a reproducing unit having a data detector according to a preferred embodiment of the present invention.

In FIG. 2, a playback amplifier 114, an equalizer 116, a channel demodulator 118 and a clock generator 124 are the same or equivalent to those of FIG. 1, thus detailed explanations thereof will be omitted.

As shown in FIG. 2, a data detector 200 according to an embodiment of the present invention includes an ADC 202, a digital Viterbi decoder 204, and a phase detector and error voltage generator 206. The data detector 200 differs from the conventional data detector 126 in that it includes the phase detector and error voltage generator 206 which detects a phase error of the reproduced signal output from the ADC 202, generates a voltage signal corresponding to the detected phase error, and controls the phase of a sampling point of the ADC 202 by applying the generated voltage signal to the clock generator 124.

Figure 3:
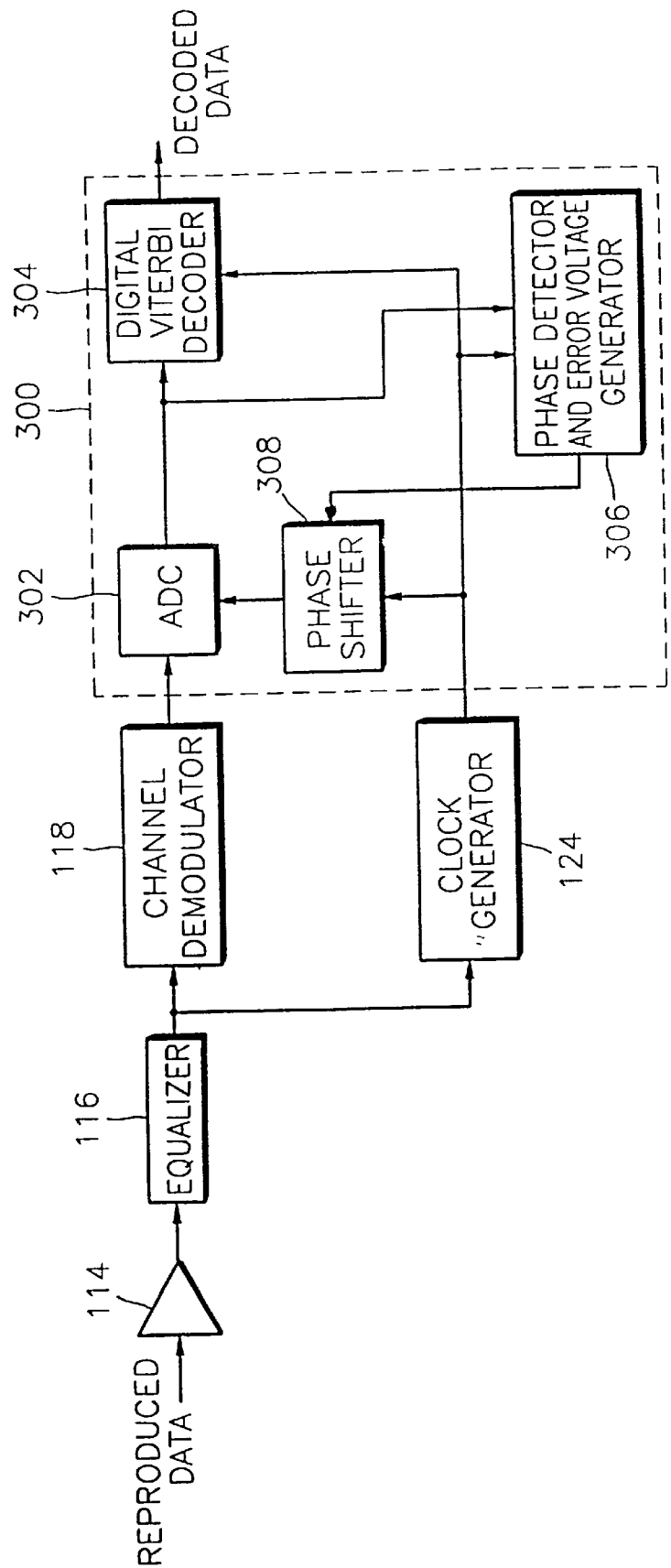
FIG. 3 is a block diagram of a reproducing unit having a data detector according to another embodiment of the present invention.

FIG. 3 is a block diagram of a reproducing circuit having a data detector 300 according to another embodiment of the present invention. Unlike the data detector 200 of FIG. 2, the data detector 300 of FIG. 3 further includes a phase shifter 308 which shifts the phase of a sampling clock signal generated by the clock generator 124 according to a voltage signal corresponding to the phase error, which is generated by the phase detector and error voltage generator 306. The phase shifter applies the result to an analog-to-digital converter (ADC) 302.

In the case of the data detector 200 of FIG. 2, the clock generator 124 includes a function for shifting a sampling clock signal according to the voltage signal corresponding to the phase error, generated by the phase detector and error voltage generator 206. The data detector 300 of FIG. 3 includes the separate phase shifter 308 to perform a phase shifting function.

The operation of the data detector according to the present invention will be described with reference to FIGS. 3 through 8.

Figure 4:
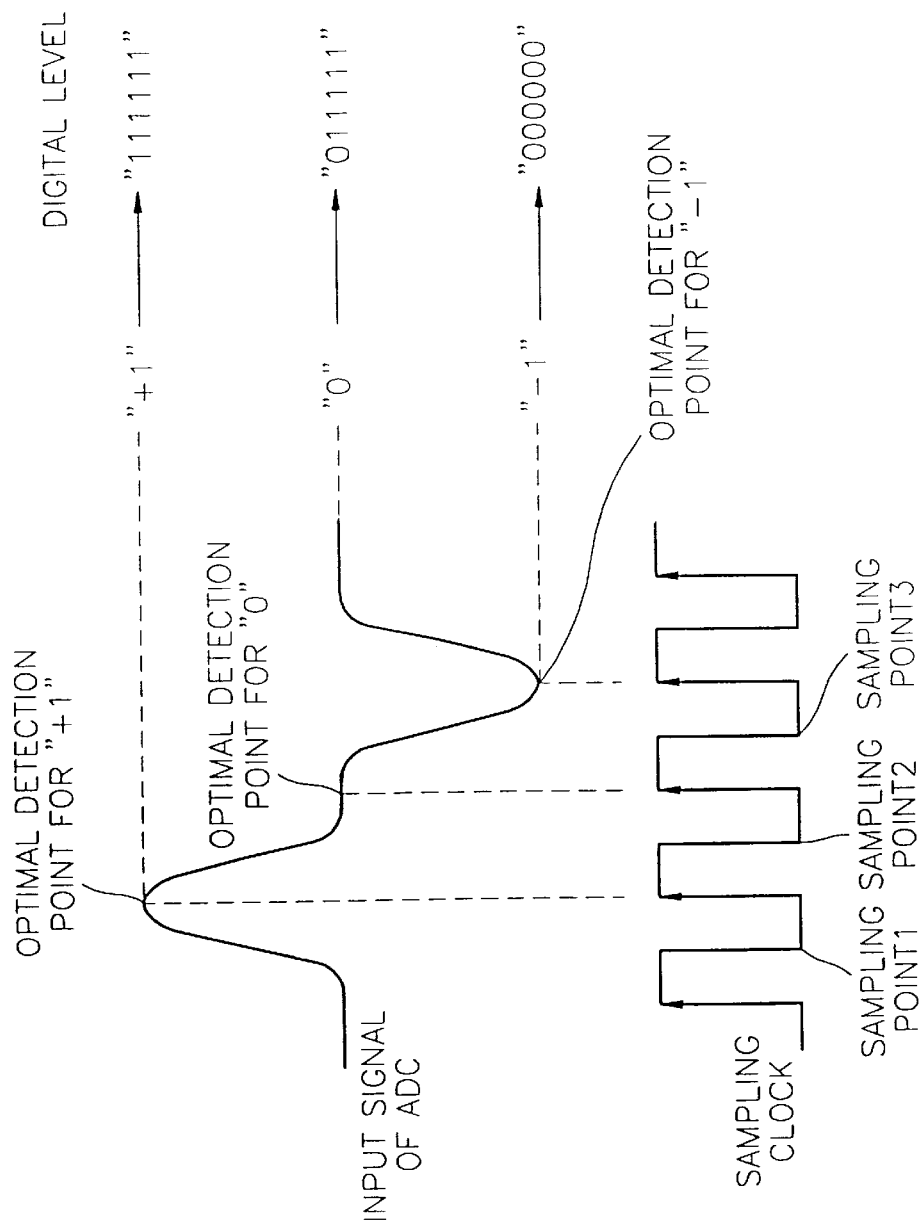
FIG. 4 shows an ideal case where the phase of the optimal detection point coincides with the phase of the sampling point.

First, the ideal sampling point of the ADC 302, as a detection point of the reproduced data, will be considered. This case is shown in FIG. 4, where the sampling point is at the optimal detection point, thereby enhancing decoding performance of the digital Viterbi decoder 304. The digital Viterbi decoder 304 may use any of the various Viterbi decoding algorithms, the details of which are well known and thus are not discussed here.

It is noted that the level of the signal input to the ADC 302 is also important. However, it is assumed here that the playback amplifier 114 uses automatic gain control (AGC) to constantly maintain the level of the signal provided to the ADC 302. Accordingly, the effect of variation in the level of the input reproduced signal is disregarded. In this explanation, it is assumed that the digital output level of the ADC 302 with respect to an analog input signal has a 6-bit linear quantization characteristic such that "−1" is converted to "000000", "0" to "011111", and "+1" to "111111".

Generally, the ADC 302 is comprised of a sample & hold circuit, where only the analog value of the input reproduced signal at the sampling point is output as a digital value. As shown in FIG. 4, the reproduced signal input to the ADC converter 302 has three optimal detection points "+1", "0" and "−1", and in the ideal case, the sampling points for the input signal coincide with these optimal detection points. In this case, the ADC 302 has no negative effect at all on the performance of the digital Viterbi decoder 304.

Figure 5:
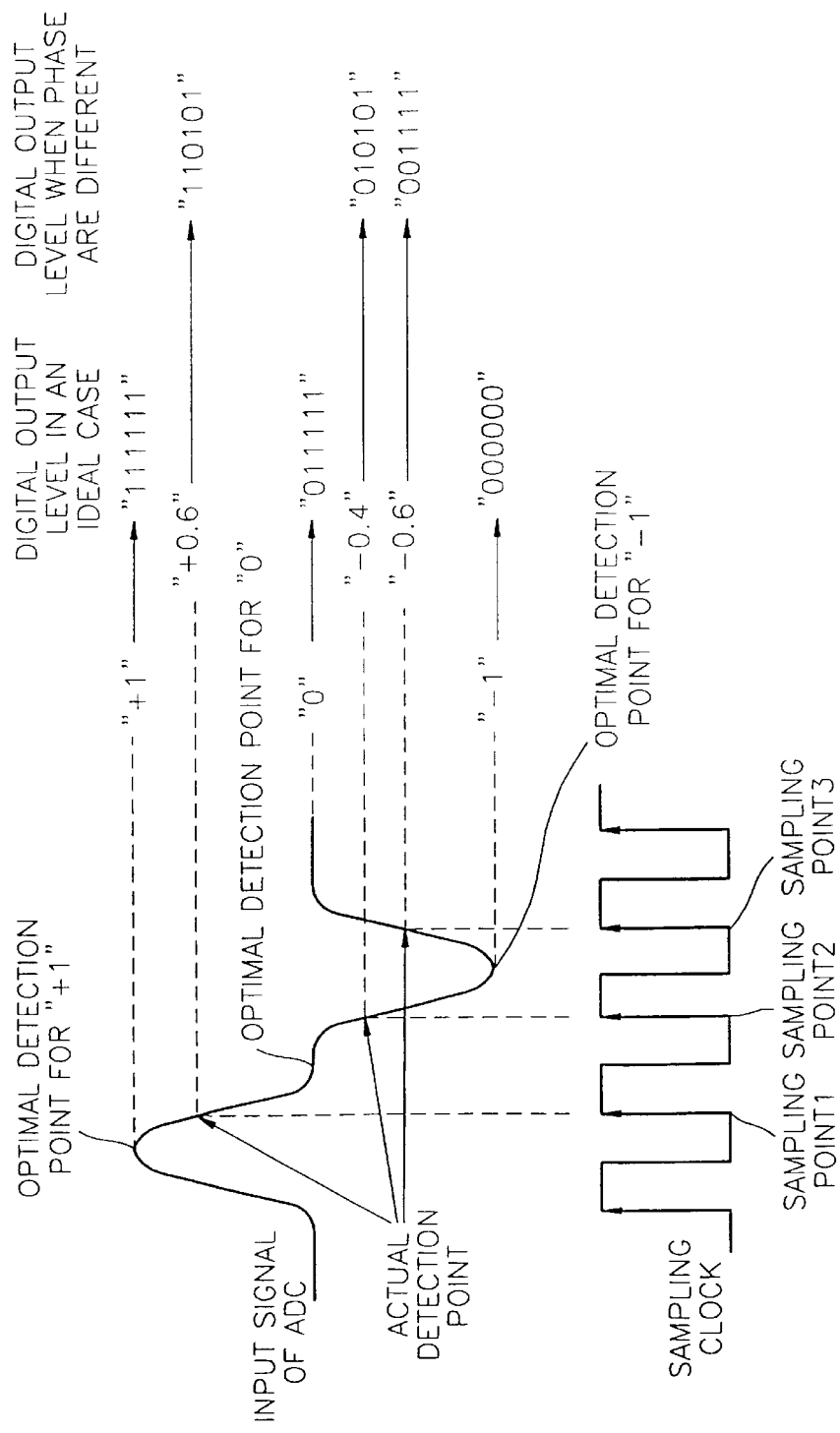
FIG. 5 shows a case where the phase of the optimal detection point does not coincide with the phase of the sampling point.

However, in real application, the phase of the sampling points for the input signal is different from that of the optimal detection points. An example of this is shown in FIG. 5. In FIG. 5, since the sampling point has diverged from the optimal detection point by "0.4", the level of the digital output signal has diverged by the same amount. The digital Viterbi decoder 304 performs a soft decision based on the level of digital output signal, so the Viterbi decoding performance is lowered according to the degree of divergence. In other words, as the phase difference between the sampling points and the optimal detection points decreases, performance of the digital Viterbi decoder 304 is better. Thus, the present invention uses the phase detector and error voltage generator 306 to minimize the phase difference to allow near-ideal performance of the digital Viterbi decoder 304. The phase detector and error voltage generator 306 measures the phase difference between the sampling points and the optimal detection points, using the digital output level of the A/D converter 302, and converts the measured phase difference into an error voltage. The error voltage is used to shift the phase of the sampling clock signal of the A/D converter 302, thereby minimizing the phase difference.

Figure 6:
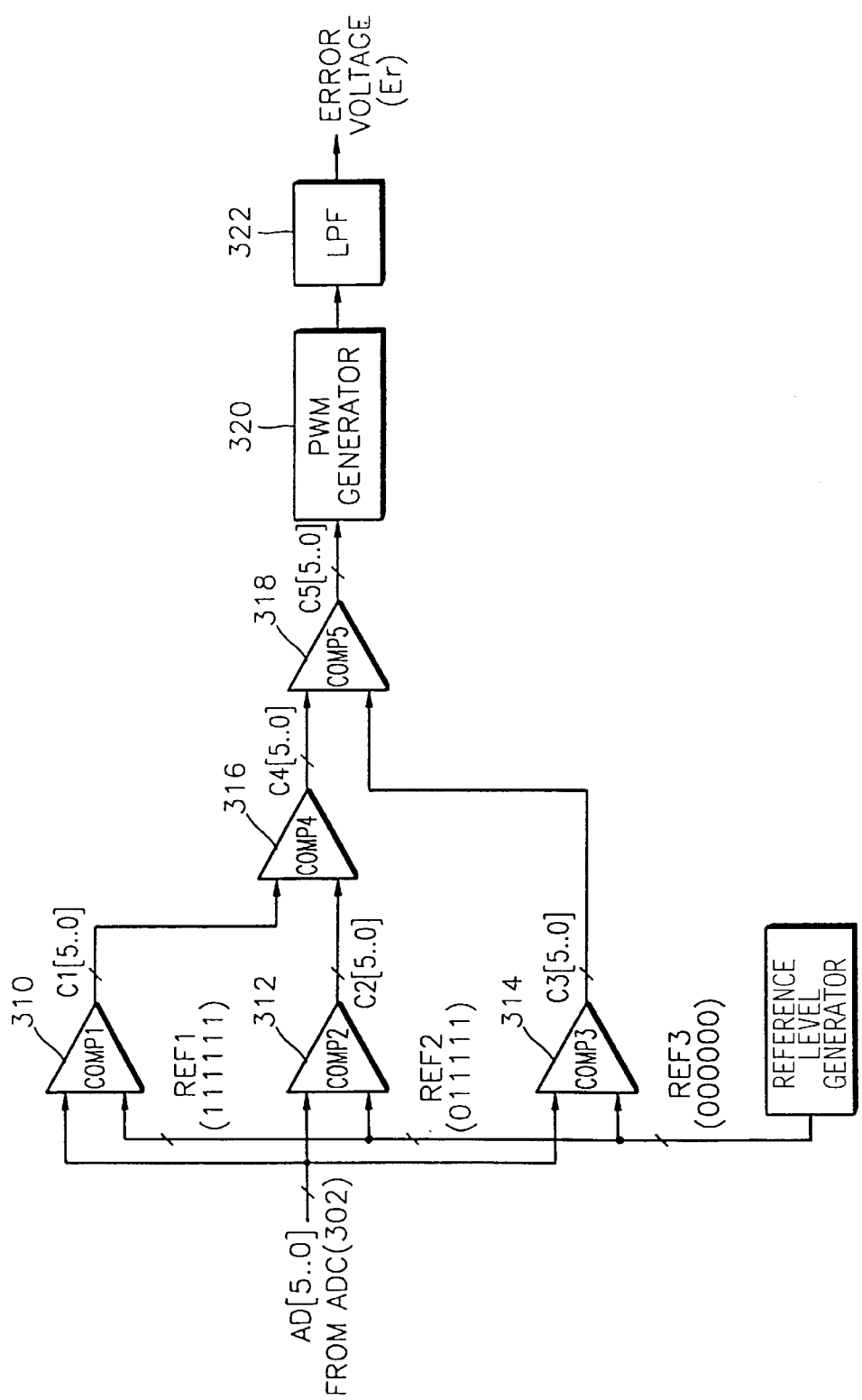
FIG. 6 is a block diagram showing the structure of a phase detector and error voltage generator shown in FIG. 3.
Figure 7:
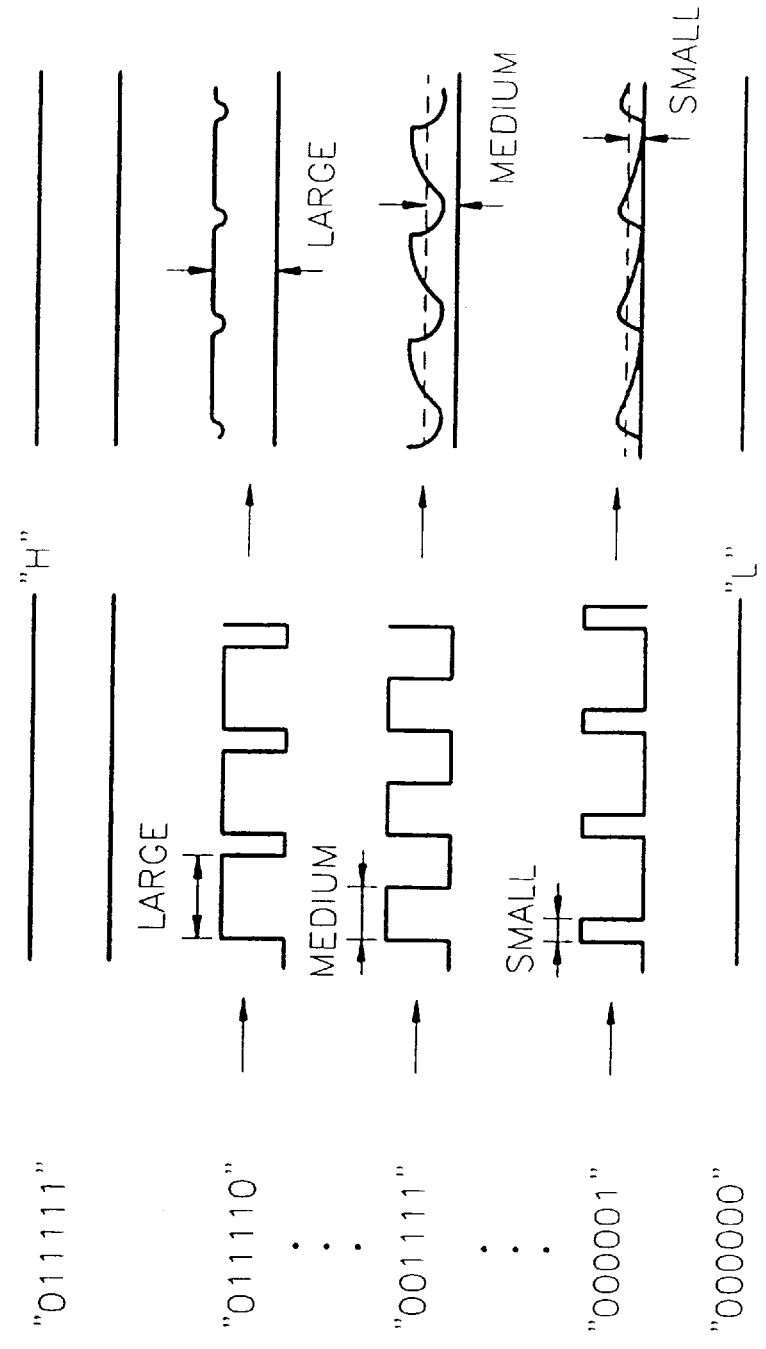
FIGS. 7A, 7B and 7C show the input and output signal waveforms of a PWM generator and the output signal waveform of a low pass filter of FIG. 6 according to variations in phase differences.

FIG. 6 is a detailed diagram showing the structure of the phase detector and error voltage generator 306 of FIG. 3. The output AD[5..0] of the ADC 302 shown in FIG. 3 is input to first through third comparators 310, 312 and 314. A first reference level REF1:111111, which represents the optimal detection point for level "+1", is also input to the first comparator 310. The first comparator 310 measures the difference between the output AD[5..0] of the ADC 302 and the first reference level REF1.

The second comparator 312 receives a second reference level REF2:011111, which represents the optimal detection point for level "0", to measure the difference between the output level AD[5..0] of the ADC 302 and the second reference level REF2. The third comparator 314 receives a third reference level REF3:000000, which represents the optimal detection point for level "−1", to measure the difference between the output AD[5..0] of the ADC 302 and the third reference level REF3. Also, the phase detector and error voltage generator 306 includes a reference level generator 307 for generating the first, second and third reference levels.

The first, second and third comparators 310, 312 and 314 each output the difference between their two input levels as an absolute value. Here, if the ADC 302 samples the reproduced signal at the first sampling point of FIG. 4, the output of the first comparator 310 becomes "000000", the output of the second comparator 312 becomes "100000" and the output of the third comparator 314 becomes "111111".

In the same manner, if the ADC 302 samples the reproduced signal at the second sampling point of FIG. 4, the output of the second comparator 312 becomes "000000", and if the ADC 302 samples the reproduced signal at the third sampling point of FIG. 4, the output of the third comparator 314 becomes "000000".

The fourth and fifth comparators 316 and 318 each work differently from the first, second and third comparators 310, 312 and 314. Comparators 316 and 318 compare two input levels and output the lower of the two. More specifically, the fourth comparator 316 compares the output C1[5..0] of the first comparator 310 with the output C2[5..0] of the second comparator 312, and outputs whichever has the lower level, thereby determining whether the current sampling point is a detection point for "+1" or "0". The fifth comparator 318 compares the output C3[5..0] of the third comparator 314 with the output C4[5..0] of the fourth comparator 316 and outputs whichever has the lower level, thereby determining whether the current sampling point is a detection point for "+1", "0" or "−1".

The first through third comparators 310, 312 and 314 measure the difference between the sampling point of the input reproduced signal and the three optimal detection points, and the fourth and fifth comparators 316 and 318 determine where the optimal detection point is. For example, at the first sampling point of FIG. 4, the output C5[5..0] of the fifth comparator 318 becomes "000000". Also, at the first sampling point of FIG. 5, the output C5[5..0] of the fifth comparator 318 becomes "001010".

A pulse width modulation (PWM) generator 320 varies the pulse width of its output signal according to the change in its input signal. The output C5[5..0] of the fifth comparator 318, which is input to the PWM generator 320, ranges from "000000" (zero phase difference) at the least, to "011111" (180° phase difference) at the most.

FIG. 7A shows the digital level input to the PWM generator 320, representing the phase difference, and FIGS. 7B and 7C are the output signal waveforms of the PWM generator 320 and the LPF 322, respectively, according to the phase difference. As shown in FIG. 7A, with respect to the input digital levels from "000000" to "011111" of the PWM generator 320, the level of the output signal of the PWM generator 320 ranges from "low" to "high" as shown in FIG. 7B. The higher the digital level, the wider the pulse width of the output of the PWM generator 320. The LPF 322 generates a voltage proportionate to the pulse width of the output signal of the PWM generator 320 (see FIG. 7C). In the above manner, the output C5[5..0] of the fifth comparator 318, corresponding to the detected phase difference, is converted to an error voltage (Er).

Figure 8:
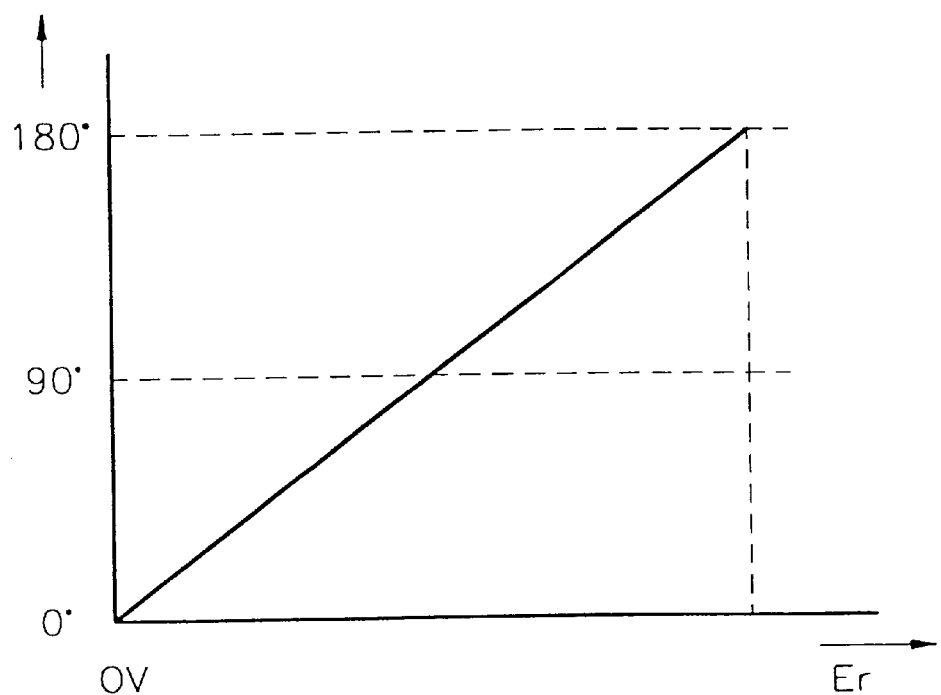
FIG. 8 shows the operational principle of a phase shifter of FIG. 6.

The error voltage Er generated by the LPF 322 is applied to the phase shifter 308 shown in FIG. 3, and the phase shifter 308 shifts the phase of the sampling clock signal applied to the ADC 302 according to the principle shown in FIG. 8. That is, the higher the error voltage Er generated by the LPF 322, the more the phase of the sampling clock signal is shifted. The series of operations continues until the phase of the sampling points of the ADC 302 coincides with that of the optimal detection points of the reproduced input signal. If the conditions reach the optimum, the optimal state is held until a phase error is generated.

In summary, the present invention is applicable in the recording and reproduction of an actual digital image signal to ensure compatibility among various systems, which may exchange signals of greatly varying amplitude and phase. Changes in amplitude can be compensated by adopting an AGC amplifier. However, deterioration of performance in the digital Viterbi decoder, caused by the change in phase as well as in amplitude, can be significant. Thus, the data detector of the present invention adopts the phase detector and error voltage generator 306 in order to compensate for changes in phase. More particularly, the phase of the sampling points of the ADC 302, as data detection points, is measured, to match the phase of the sampling points with that of the optimal detection points. As a result, the error caused by the difference of phase is minimized, thereby enhancing the performance of the digital Viterbi decoder 304, and the overall performance for detecting the reproduced data.

As described above, the data detector and the data detection method according to the present invention can improve performance in detection of reproduced data while coping with various changes in the reproduced signal.

Though a preferred embodiment of the invention has been described above, one skilled in the art would recognize that several variations can be made without departing from the spirit and scope of the present invention.

What is claimed is:

1. A data detector comprising:
   a converter for converting a received signal into digital data according to a sampling clock signal;
   a maximum likelihood decoder for performing maximum likelihood decoding of the digital data; and
   an error voltage generator for measuring a phase difference between sampling points of the digital data and optimal detection points for the received signal, and for generating a control signal for changing the phase of the sampling clock signal according to the measured phase difference;
      wherein the error voltage generator measures the phase difference by measuring a difference in phase between a single sample point of the digital data and more than one of the optimal detection points.

2. The data detector of claim 1, wherein the number of optimal detection points is one or more.

3. The data detector of claim 1, wherein the error voltage generator comprises:
   a calculator for calculating absolute values of the differences between the level of the digital data output by the converter and each of a plurality of reference levels corresponding to the optimal detection points, and outputting at least one of the differences as a phase error; and
   a control signal generator for generating the control signal according to the phase error.

4. The data detector of claim 3, wherein the calculator comprises:
   a first comparator for comparing a first reference level which represents the optimal detection point for a level "+1" with the level of the digital data output by the converter to measure the difference therebetween;
   a second comparator for comparing a second reference level representing the optimal detection point for a level "0" with the level of the digital data output by the converter, to measure the difference therebetween;
   a third comparator for comparing a third reference level representing the optimal detection point for a level "−1" with the level of the digital data output by the converter, to measure the difference therebetween;
   a fourth comparator for comparing the outputs of the first and second comparators, and outputting the lower of the outputs from the first and second comparators; and
   a fifth comparator for comparing the outputs of the third and fourth comparators and outputting the lower of the outputs from the third and fourth comparators as the phase error.

5. The data detector of claim 3, wherein the control signal generator comprises:
a pulse width modulation (PWM) generator for generating a PWM signal according to the phase error; and
a low pass filter for converting the PWM signal into a voltage signal and for outputting the voltage signal as the control signal.

6. The data detector of claim 3, further comprising:
a clock generator for generating the sampling clock signal and for changing the phase of the sampling clock signal according to the control signal, and applying the resulting sampling clock signal to the converter; and
a reference level generator for generating the plurality of reference levels corresponding to the optimal detection points.

7. The data detector of claim 1, wherein the optimal detection points are represented by reference levels.

8. The data detector of claim 7, wherein the reference levels are greater than or less than zero.

9. A data detector comprising:
a converter for converting a received signal into digital data according to a sampling clock signal;
a maximum likelihood decoder for performing maximum likelihood decoding of the digital data;
an error voltage generator for measuring a phase difference between sampling points of the digital data and optimal detection points for the received signal, and for generating a control signal corresponding to the measured phase difference; and
a phase shifter for shifting a phase of the sampling clock signal according to the control signal;
wherein the error voltage generator measures the phase difference by measuring a difference in phase between a single sample point of the digital data and more than one of the optimal detection points.

10. The data detector of claim 9, wherein the number of optimal detection points is one or more.

11. The data detector of claim 9, wherein the error voltage generator comprises:
a calculator for calculating absolute values of the differences between the level of the digital data output by the converter and each of a plurality of reference levels corresponding to the optimal detection points, and outputting at least one of the differences as a phase error; and
a control signal generator for generating the control signal according to the phase error.

12. The data detector of claim 11, wherein the calculator comprises:
a first comparator for comparing a first reference level which represents the optimal detection point for a level "+1" with the level of the digital data output by the converter to measure the difference therebetween;
a second comparator for comparing a second reference level representing the optimal detection point for a level "0" with the level of the digital data output by the converter, to measure the difference therebetween;
a third comparator for comparing a third reference level representing the optimal detection point for a level "−1" with the level of the digital data output by the converter, to measure the difference therebetween;
a fourth comparator for comparing the outputs of the first and second comparators, and outputting the lower of the outputs from the first and second comparators; and
a fifth comparator for comparing the outputs of the third and fourth comparators, and outputting the lower of the outputs of the third and fourth comparators as the phase error.

13. The data detector of claim 11, wherein the control signal generator comprises:
a pulse width modulation (PWM) generator for generating a PWM signal according to the phase error; and
a low pass filter for converting the PWM signal into a voltage signal and for outputting the voltage signal as the control signal.

14. The data detector of claim 11, further comprising a reference level generator for generating the plurality of reference levels corresponding to the optimal detection points.

15. The data detector of claim 9, wherein the optimal detection points are represented by reference levels.

16. The data detector of claim 15, wherein the reference levels are greater than or less than zero.

17. A data detector for a digital recording/reproducing apparatus with a maximum likelihood decoder, comprising:
a converter for converting an input reproduced signal into digital data according to a sampling clock signal, and for applying the digital data to the maximum likelihood decoder; and
an error voltage generator for measuring a phase difference between sampling points of the digital data and a plurality of optimal detection points for the reproduced signal, and for generating a control signal for changing the phase of the sampling clock signal according to the measured phase difference;
wherein the error voltage generator measures the phase difference by measuring a difference in phase between a single sample point of the digital data and more than one of the optimal detection points.

18. The data detector of claim 17, further comprising a phase shifter for shifting the phase of the sampling clock signal according to the control signal.

19. The data detector of claim 17, wherein the error voltage generator comprises:
a first comparator for comparing a first reference level which represents the optimal detection point for a level "+1" with the level of the digital data output by the converter to measure the difference therebetween;
a second comparator for comparing a second reference level representing the optimal detection point for a level "0" with the level of the digital data output by the converter, to measure the difference therebetween;
a third comparator for comparing a third reference level representing the optimal detection point for a level "−1" with the level of the digital data output by the converter, to measure the difference therebetween;
a fourth comparator for comparing the outputs of the first and second comparators, and outputting the lower of the outputs from the first and second comparators;
a fifth comparator for comparing the outputs of the third and fourth comparators, and outputting the lower of the outputs from the third and fourth comparators;
a pulse width modulation (PWM) generator for generating a PWM signal according to the output of the fifth comparator; and
a low pass filter for converting the PWM signal into a voltage and for outputting the voltage as the control signal.

20. The data detector of claim 17, wherein the optimal detection points are represented by reference levels.

21. The data detector of claim 20, wherein the reference levels are greater than or less than zero.

22. A method for detecting data comprising the steps of:
(a) converting a received signal into digital data according to a sampling clock signal;
(b) performing maximum likelihood decoding of the digital data;
(c) measuring a phase difference between sampling points of the digital data and optimal detection points for the received signal; and
(d) generating a control signal for changing the phase of the sampling clock signal according to the measured phase difference;
wherein the phase difference is measured by measuring a difference in phase between a single sample point of the digital data and more than one of the optimal detection points.

23. The method of claim 22, further comprising the step of (e) shifting the phase of the sampling clock signal according to the control signal.

24. The method of claim 22, wherein the step (c) comprises:
(c1) calculating absolute values of the differences between the level of the digital data obtained in the converting step (a) and each of a plurality of reference levels corresponding to the optimal detection points, to measure a phase error; and
wherein said step (d) comprises:
(d1) generating the control signal corresponding to the phase error.

25. The method of claim 22, wherein the step (c) comprises the sub-steps of:
(c1) comparing a first reference level which represents the optimal detection point for a level "+1" with the level of the digital data obtained in the converting step (a), to measure the difference therebetween and to output a first signal;
(c2) comparing a second reference level which represents the optimal detection point for a level "0" with the level of the digital data obtained in the converting step (a), to measure the difference therebetween and to output a second signal;
(c3) comparing a third reference level which represents the optimal detection point for a level "−1" with the level of the digital data obtained in by the converting step (a), to measure the difference therebetween and to output a third signal;
(c4) comparing the levels of the first and second signals, and outputting the lower of the first and second signals as a fourth signal; and
(c5) comparing the levels of the third and fourth signals, and outputting the lower of the third and fourth signals as a phase error; and
wherein said step (d) comprises:
(d1) converting the phase error into a PWM signal; and
(d2) converting the PWM signal into a voltage which is the control signal.

26. The method for detecting data of claim 22, wherein the optimal detection points are represented by reference levels.

27. The data detector of claim 26, wherein the reference levels are greater than or less than zero.

28. A data detector comprising:
a converter for converting a received signal into digital data according to a sampling clock signal;
a maximum likelihood decoder for performing maximum likelihood decoding of the digital data; and
an error voltage generator for measuring a phase difference between sampling points of the digital data and optimal detection points for the received signal, and for generating a control signal for changing the phase of the sampling clock signal according to the measured phase difference, the error voltage generator comprising:
a calculator for calculating absolute values of the differences between the level of the digital data output by the converter and each of a plurality of reference levels corresponding to the optimal detection points, and outputting at least one of the differences as a phase error; and
a control signal generator for generating the control signal according to the phase error;
wherein the calculator comprises:
a first comparator for comparing a first reference level which represents the optimal detection point for a level "+1" with the level of the digital data output by the converter to measure the difference therebetween;
a second comparator for comparing a second reference level representing the optimal detection point for a level "0" with the level of the digital data output by the converter, to measure the difference therebetween;
a third comparator for comparing a third reference level representing the optimal detection point for a level "−1" with the level of the digital data output by the converter, to measure the difference therebetween;
a fourth comparator for comparing the outputs of the first and second comparators, and outputting the lower of the outputs from the first and second comparators; and
a fifth comparator for comparing the outputs of the third and fourth comparators and outputting the lower of the outputs from the third and fourth comparators as the phase error.

29. A data detector comprising:
a converter for converting a received signal into digital data according to a sampling clock signal;
a maximum likelihood decoder for performing maximum likelihood decoding of the digital data;
an error voltage generator for measuring a phase difference between sampling points of the digital data and optimal detection points for the received signal, and for generating a control signal corresponding to the measured phase difference; and
a phase shifter for shifting a phase of the sampling clock signal according to the control signal;
wherein the error voltage generator comprises:
a calculator for calculating absolute values of the differences between the level of the digital data output by the converter and each of a plurality of reference levels corresponding to the optimal detection points, and outputting at least one of the differences as a phase error; and
a control signal generator for generating the control signal according to the phase error;
wherein the calculator comprises:
a first comparator for comparing a first reference level which represents the optimal detection point for a level "+1" with the level of the digital data output by the converter to measure the difference therebetween;

a second comparator for comparing a second reference level representing the optimal detection point for a level "0" with the level of the digital data output by the converter, to measure the difference therebetween;

a third comparator for comparing a third reference level representing the optimal detection point for a level "−1" with the level of the digital data output by the converter, to measure the difference therebetween;

a fourth comparator for comparing the outputs of the first and second comparators, and outputting the lower of the outputs from the first and second comparators; and a fifth comparator for comparing the outputs of the third and fourth comparators, and outputting the lower of the outputs of the third and fourth comparators as the phase error.

30. A data detector for a digital recording/reproducing apparatus with a maximum likelihood decoder, comprising:

a converter for converting an input reproduced signal into digital data according to a sampling clock signal, and for applying the digital data to the maximum likelihood decoder; and an error voltage generator for measuring a phase difference between sampling points of the digital data and a plurality of optimal detection points for the reproduced signal, and for generating a control signal for changing the phase of the sampling clock signal according to the measured phase difference, the error voltage generator comprising:

a first comparator for comparing a first reference level which represents the optimal detection point for a level "+1" with the level of the digital data output by the converter to measure the difference therebetween;

a second comparator for comparing a second reference level representing the optimal detection point for a level "0" with the level of the digital data output by the converter, to measure the difference therebetween;

a third comparator for comparing a third reference level representing the optimal detection point for a level "−1" with the level of the digital data output by the converter, to measure the difference therebetween;

a fourth comparator for comparing the outputs of the first and second comparators, and outputting the lower of the outputs from the first and second comparators;

a fifth comparator for comparing the outputs of the third and fourth comparators, and outputting the lower of the outputs from the third and fourth comparators;

a pulse width modulation (PWM) generator for generating a PWM signal according to the output of the fifth comparator; and a low pass filter for converting the PWM signal into a voltage and for outputting the voltage as the control signal.

31. A method for detecting data comprising the steps of:

(a) converting a received signal into digital data according to a sampling clock signal;

(b) performing maximum likelihood decoding of the digital data;

(c) measuring a phase difference between sampling points of the digital data and optimal detection points for the received signal; and (d) generating a control signal for changing the phase of the sampling clock signal according to the measured phase difference;

wherein the step (c) comprises the sub-steps of:

(c1) comparing a first reference level which represents the optimal detection point for a level "+1" with the level of the digital data obtained in the converting step (a), to measure the difference therebetween and to output a first signal;

(c2) comparing a second reference level which represents the optimal detection point for a level "0" with the level of the digital data obtained in the converting step (a), to measure the difference therebetween and to output a second signal;

(c3) comparing a third reference level which represents the optimal detection point for a level "−1" with the level of the digital data output by the converting step (a), to measure the difference therebetween and to output a third signal;

(c4) comparing the levels of the first and second signals, and outputting the lower of the first and second signals as a fourth signal; and (c5) comparing the levels of the third and fourth signals, and outputting the lower of the third and fourth signals as a phase error; and wherein said step (d) comprises:

(d1) converting the phase error into a PWM signal; and (d2) converting the PWM signal into a voltage which is the control signal.

* * * * *